United States Patent
Henson

(10) Patent No.: US 12,404,002 B2
(45) Date of Patent: Sep. 2, 2025

(54) SKIN ASSEMBLY AND METHOD FOR MANUFACTURING THE SAME

(71) Applicant: General Electric Company, Schenectady, NY (US)

(72) Inventor: Grant Henson, Niskayuna, NY (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 260 days.

(21) Appl. No.: 17/980,605

(22) Filed: Nov. 4, 2022

(65) Prior Publication Data
US 2024/0150003 A1 May 9, 2024

(51) Int. Cl.
| | |
|---|---|
| B32B 18/00 | (2006.01) |
| B32B 3/06 | (2006.01) |
| B64C 1/12 | (2006.01) |
| B64C 1/38 | (2006.01) |
| B64C 30/00 | (2006.01) |
| C04B 35/565 | (2006.01) |
| C04B 35/80 | (2006.01) |
| C04B 41/91 | (2006.01) |
| C04B 111/00 | (2006.01) |

(52) U.S. Cl.
CPC .......... B64C 1/12 (2013.01); B32B 3/06 (2013.01); B32B 18/00 (2013.01); B64C 1/38 (2013.01); B64C 30/00 (2013.01); C04B 35/565 (2013.01); C04B 35/80 (2013.01); C04B 41/91 (2013.01); C04B 2111/00982 (2013.01); C04B 2237/82 (2013.01)

(58) Field of Classification Search
None
See application file for complete search history.

(56) References Cited

U.S. PATENT DOCUMENTS

| | | | |
|---|---|---|---|
| 5,560,569 A | 10/1996 | Schmidt | |
| 6,058,846 A | 5/2000 | Boyd | |
| 6,132,542 A * | 10/2000 | Cutler | C04B 35/80 156/89.27 |
| 6,974,109 B1 | 12/2005 | Mezits et al. | |
| 8,714,491 B2 | 5/2014 | Simon et al. | |
| 9,951,630 B2 * | 4/2018 | Hass | C23C 14/08 |
| 11,235,894 B2 | 2/2022 | Nevarez et al. | |
| 11,326,551 B1 | 5/2022 | Sutterfield et al. | |
| 2016/0003094 A1 | 1/2016 | Renggli et al. | |
| 2019/0071364 A1 | 3/2019 | Harada et al. | |

FOREIGN PATENT DOCUMENTS

CN 215862279 U 2/2022

* cited by examiner

*Primary Examiner* — Daniel J. Schleis
(74) *Attorney, Agent, or Firm* — Carter, DeLuca & Farrell LLP

(57) ABSTRACT

A skin assembly that includes a first ceramic-matrix-composite skin panel including one or more first fingers extending along a first direction. The skin assembly further includes a second ceramic-matrix-composite skin panel including one or more second fingers extending along the first direction. The one or more second fingers interdigitated with the one or more first fingers to define a plurality of staggered expansion gaps between the first ceramic-matrix-composite skin panel and the second ceramic-matrix-composite skin panel wherein the plurality of staggered expansion gaps are configured to accommodate thermal expansion of at least a portion of the skin assembly.

20 Claims, 8 Drawing Sheets

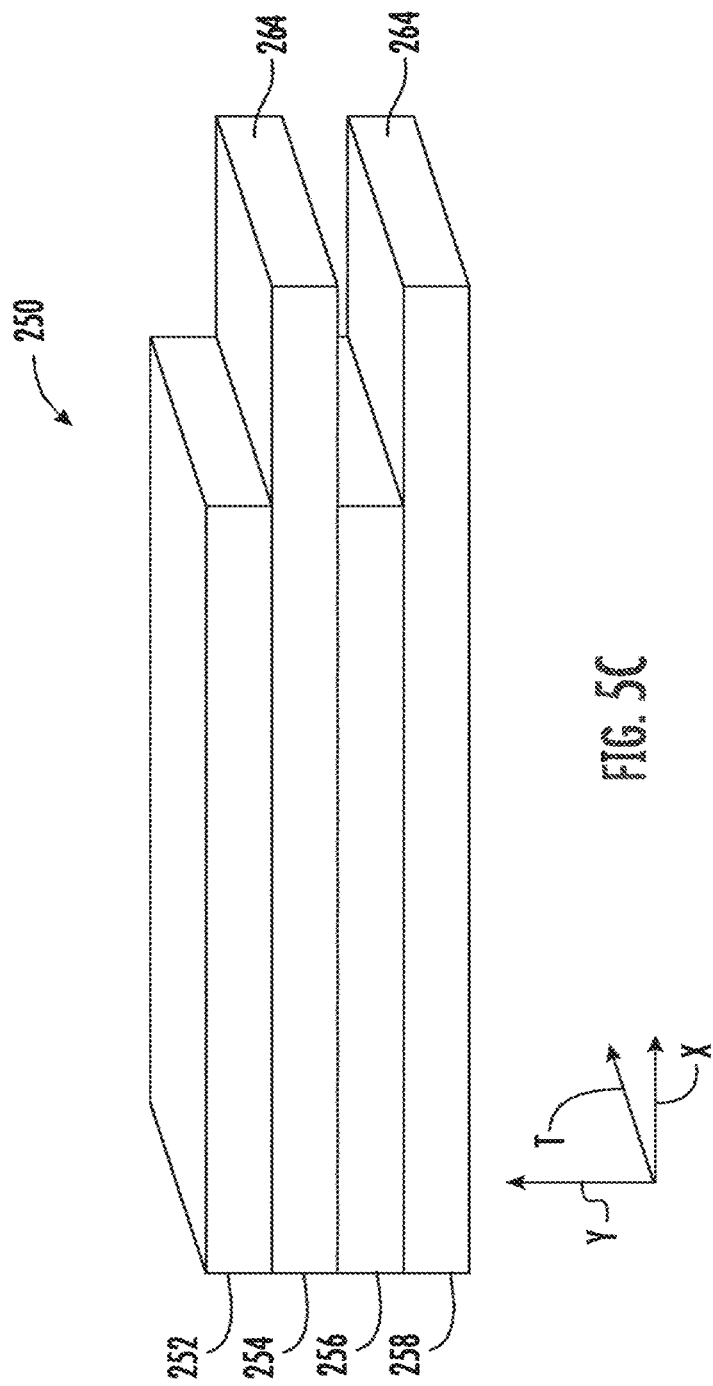

SKIN ASSEMBLY AND METHOD FOR MANUFACTURING THE SAME

FIELD

The present subject matter relates generally to skin technologies such as laminated skin technologies.

BACKGROUND

Hypersonic vehicles generally refer to vehicles that can achieve flight through the atmosphere below altitudes of about 90 km at speeds greater than Mach 5, a speed where high heat loads exist. As such, hypersonic vehicles are often subject to extreme operating conditions, including high temperatures and high pressures. For example, as a hypersonic aerospace vehicle moves through the air, the air surrounding the vehicle gets hot due to drag and compression induced by the fast-moving vehicle. As the vehicle travels faster, temperatures increase in and around the vehicle. These extreme operating conditions may also cause vibrations and shock waves that limit the performance of the aircraft and its components.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 5C illustrates a constructed ceramic-matrix-composite skin panel according to the embodiment of FIGS. 5A and 5B.

DETAILED DESCRIPTION

Figure 1:
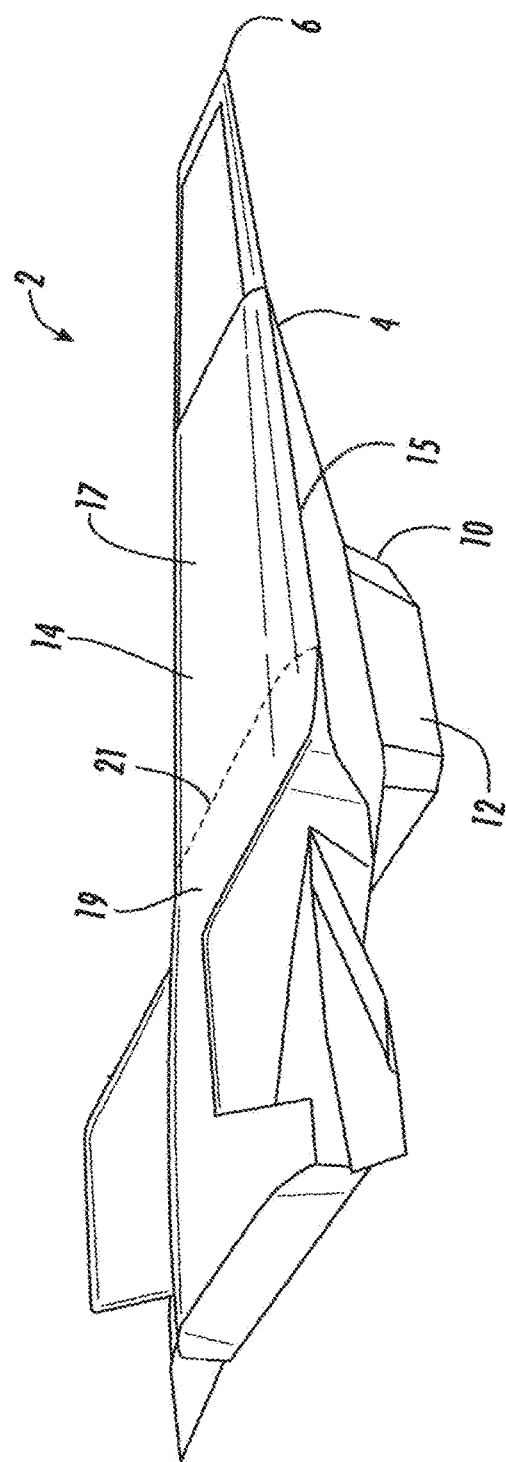
FIG. 1 is a perspective view of a hypersonic vehicle in accordance with an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "coupled" and the like refer to both direct coupling, as well as indirect coupling through one or more intermediate components or features, unless otherwise specified herein.

As used herein, the terms "first", "second", "third", and "fourth" may be used interchangeably to distinguish one component from another and are not intended to signify location or importance of the individual components.

As used herein, the term "integral" as used to describe a structure refers to the structure being formed integrally of a continuous material or group of materials with no seams, connections joints, or the like. The integral, unitary structures described herein may be formed through prepreg tape lay-up, additive manufacturing, or alternatively through a casting process, etc.

The term "adjacent" as used herein with reference to two walls and/or surfaces refers to the two walls and/or surfaces contacting one another, or the two walls and/or surfaces being separated only by one or more nonstructural layers and the two walls and/or surfaces and the one or more nonstructural layers being in a serial contact relationship (i.e., a first wall/surface contacting the one or more nonstructural layers, and the one or more nonstructural layers contacting the a second wall/surface).

Generally, skins are constrained or attached to an underlying framework of a structure to provide an aerodynamic surface for the structure and protect the structure from a harsh environment that it may be subjected to. For example, a high speed vehicle, such as a hypersonic aircraft, may include a skin that is constrained or attached to an airframe of the high speed vehicle to provide an aerodynamic surface for the high speed vehicle and to protect the high speed vehicle during demanding flight conditions. Commonly, skins include one or more skin panels that interface with an adjacent skin panel to form the skin. As such, the skin may be referred to as a skin assembly.

Further, in some harsh environments, the skin assembly may be subjected to severe heating that causes the one or more skin panels to thermally expand. Thus, leading to the skin assembly experiencing thermal stress. This thermal stress may be disadvantageous to the aerodynamic surface that the skin assembly may be designed to provide. For example, thermal stress may result in buckling of the skin assembly, and more particularly, may result in buckling of the one or more skin panels.

In addition, skin panels of skin assemblies are commonly constructed from ceramic-matrix-composite materials (e.g., silicon carbide-fiber-reinforced silicon carbide composites and carbon-fiber-reinforced silicon carbide composites). When compared to skin panels constructed from other composite materials (e.g., carbon-carbon composites), skin panels constructed from ceramic-matrix-composite materials may possess greater durability in environments with severe conditions, such as oxidizing environments. However, the materials that may be used in the ceramic-matrix-composite materials, (e.g., silicon carbide) may have a higher coefficient of thermal expansion when compared to the materials used in other composite materials (e.g., carbon). As such, ceramic-matrix-composite materials, and more particularly skin panels constructed from ceramicmatrix-composite materials may experience a higher level of thermal stress when subjected to severe heating (e.g., during a demanding flight condition).

Accordingly, any means to mitigate thermal stress that skin assemblies, and more particularly, the skin panels may experience while continuing to provide an aerodynamic surface for the structure that the skin assembly may be constrained to or attached to would be desirable.

Accordingly, the present disclosure is generally related to a skin assembly with features to mitigate thermal stress. In particular, in one exemplary embodiment of the present disclosure, a skin assembly is provided. The skin assembly includes a first ceramic-matrix-composite skin panel including one or more first fingers extending along a first direction. In addition, the skin assembly includes a second ceramic-matrix-composite skin panel including one or more second fingers extending along the first direction. The one or more second fingers interdigitated with the one or more first fingers to define a plurality of staggered expansion gaps between the first ceramic-matrix-composite skin panel and the second ceramic-matrix-composite skin panel. The plurality of staggered expansion gaps are configured to accommodate thermal expansion of at least a portion of the skin assembly.

In another exemplary embodiment of the present disclosure, a skin assembly is provided. The skin assembly includes a first skin panel including one or more first fingers extending along a first direction. In addition, the skin assembly includes a second skin panel including one or more second fingers extending along the first direction. The one or more second fingers interdigitated with the one or more first fingers to define a plurality of staggered expansion gaps between the first skin panel and the second skin panel. The plurality of staggered expansion gaps are configured to accommodate thermal expansion of at least a portion of the skin assembly.

In addition, in an embodiment, a method of constructing a skin assembly is provided. The method generally includes forming a first skin panel and a second skin panel. In addition, the method includes removing material from the first skin panel and the second skin panel, respectively, to form one or more first fingers and one more second fingers. In addition, the method includes joining the first skin panel and the second skin panel such that the first skin panel and the second skin panel define a plurality of staggered expansion gaps therebetween.

Referring now to the drawings, wherein identical numerals indicate the same elements throughout the figures, FIG. 1 is a perspective view of a hypersonic aircraft 2 in accordance with an exemplary embodiment of the present disclosure is provided. As used herein, the term "hypersonic" refers generally to air speeds above Mach 5. However, it should be appreciated that aspects of the present subject matter are not limited only to hypersonic aircraft 2 but may instead apply to applications involving other hypersonic vehicles, projectiles, objects, etc. with flight Mach numbers of less than 5.

In general, hypersonic vehicles, typically experience extremely high temperatures during high speed or hypersonic operating conditions. As such, a skin is typically provided on at least a portion of a hypersonic vehicle to protect the hypersonic vehicle when experiencing extremely high temperatures. The skin may include one or more skin panels that are connected to form a substantially continuous skin. As such, the in certain exemplary embodiments the skin may be referred to as a skin assembly.

As shown in FIG. 1, the hypersonic aircraft 2 generally includes an internal frame 15 covered by a skin assembly 14 as to provide protection to the hypersonic aircraft 2, and more particularly, the internal frame 15. In general, the skin assembly 14 is a set of flat or curved shells that interface together to define an outer surface of the hypersonic aircraft, and more particularly, any suitable component of the hypersonic aircraft. For example, the skin assembly may define the outer surface of a fuselage, a pair of wings, a pair of fins, a control surface, or a combination thereof of the hypersonic aircraft.

More particularly, as depicted, the skin assembly 14 includes two composite skin panels 17, 19. As will be described in more detail below, the two composite skin panels 17, 19 may define a plurality of staggered expansion gaps 21 (depicted in phantom). During a hypersonic operating condition, the skin assembly 14 of the hypersonic aircraft 2 may experience high thermal loading that leads to the skin assembly 14, and more specifically, the two composite skin panels, thermally expanding and potentially causing thermal stress within the skin assembly 14. As such, the skin assembly 14 may include features to mitigate thermal stress during operation.

In addition, the hypersonic aircraft includes a hypersonic propulsion engine 12, an engine cowl 10 that at least partially encases the hypersonic propulsion engine 12, aircraft wings 4, a vertical stabilizer, and a nose cone 6 at the forward end of the hypersonic aircraft 2.

Figure 2:
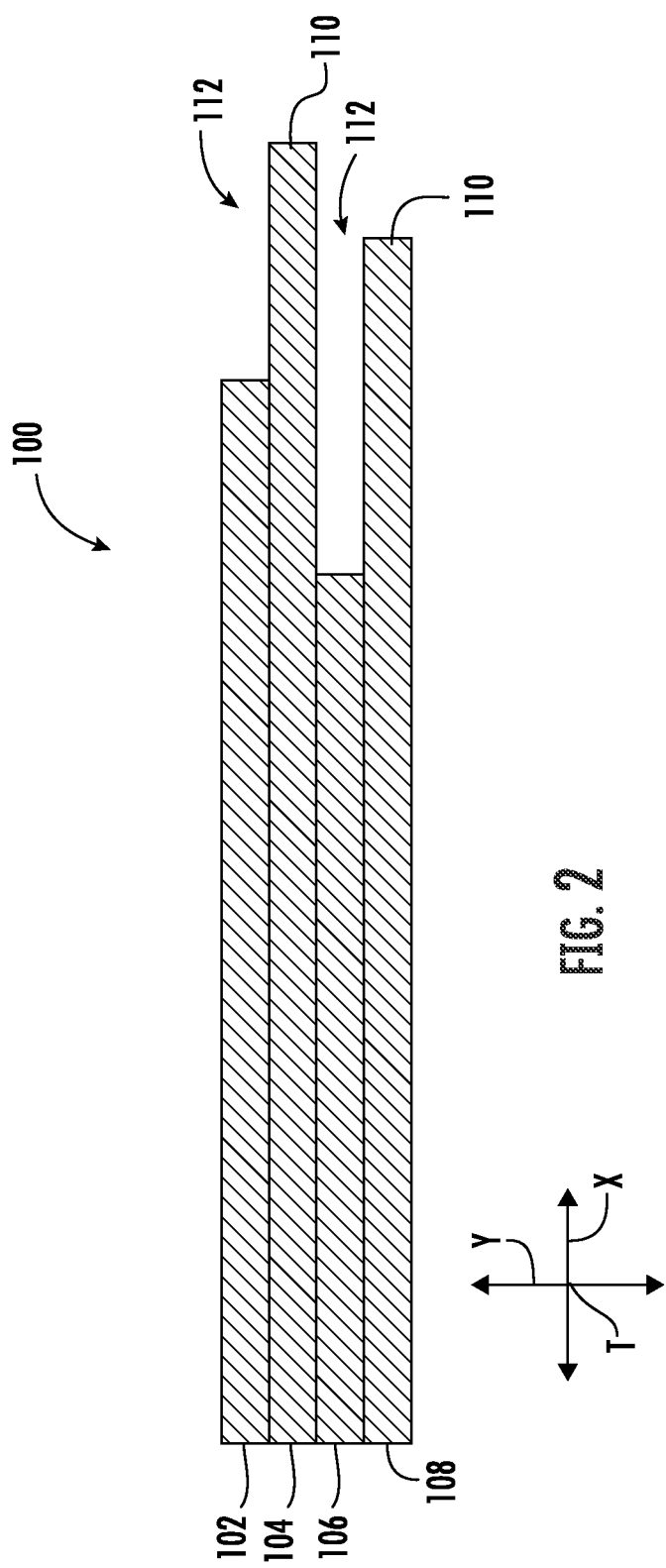
FIG. 2 is a cross-sectional view of a ceramic-matrix composite skin panel in accordance with an exemplary aspect of the present disclosure.

Referring now to FIG. 2, a cross-sectional view of a composite skin panel 100 is provided. As shown, the composite skin panel 100 is a ceramic-matrix composite skin panel 100. As used herein, ceramic-matrix-composite or "CMC" refers to a class of materials that include a reinforcing material (e.g., reinforcing fibers) surrounded by a ceramic matrix phase. Generally, the reinforcing fibers provide structural integrity to the ceramic matrix. Some examples of matrix materials of CMCs can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) may also be included within the CMC matrix.

Some examples of reinforcing fibers of CMCs can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Generally, particular CMCs may be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs may include a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain embodiments, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

It should be appreciated that in the present disclosure, the CMC skin panels may not be C/C composites. Instead, the ceramic-matrix-composite skin panels may include a SiC-based composite, and more specifically may be formed of SiC-based composite (i.e., may include at least 60% by weight SiC-based composite).

In addition, it should be appreciated that the CMC skin panel depicted is provided by way of example only and in alternative exemplary embodiments, the composite skin panel 100 may be any suitable laminated material.

As shown in FIG. 2, the CMC skin panel 100 defines a thickness direction Y, a lateral direction X, and a transverse direction T (into and out of the page in FIG. 2). It should be appreciated that the lateral direction X and the transverse direction T are local directions that are perpendicular to the thickness direction Y. As such, the lateral direction X and the transverse direction T may be positioned in any suitable direction that is perpendicular to the thickness direction Y. In addition, the CMC skin panel 100 includes a first lamina 102 having a first length extending along the lateral direction X, a second lamina 104 having a second length extending along the lateral direction X, a third lamina 106 having a third length extending along the lateral direction X, and a fourth lamina 108 having a fourth length along the lateral direction X. The first, second, third, and fourth lamina 102, 104, 106, and 108 are stacked along the thickness direction Y and inter-bonded to form the CMC skin panel 100. As such, the CMC skin panel 100 has a thickness along the thickness direction Y.

The lengths of each the first, second, third, and fourth lamina 102, 104, 106, and 108 are staggered as to form two fingers 110 that extend in the lateral direction X. In particular, the lengths are unequal along the lateral direction X, the lamina are arranged such that they start or stop at different locations along the lateral direction X, or both.

In addition, the two fingers 110 define two notches 112 that allow for interdigitating of fingers (e.g., fingers 110) of an adjacent CMC skin panel. As depicted, the notches 112 may be defined by one finger 110, or by two fingers 110. As such, the notches 112 may be configured as a channel (e.g., when defined by two fingers) that allows for interdigitating of fingers of an adjacent CMC skin panel or the notches 112 may be an open space (e.g., when defined by one finger) that allows for interdigitating of fingers of an adjacent CMC skin panel.

As will be appreciated, fingers of a CMC skin panel 100 and fingers of an adjacent CMC skin panel may be interdigitated to form a skin assembly (e.g., skin assembly 120 of FIG. 3) having a substantially continuous surface. Further, the staggered lengths of the respective first, second, third, and fourth lamina 102, 104, 106, and 108 may be configured so the interdigitated fingers are able to maintain a suitable bending stiffness of a skin assembly. Additionally, or alternatively, the staggered lengths of the respective first, second, third, and fourth lamina 102, 104, 106, and 108 may be configured to simplify assembly and disassembly of a skin assembly.

As depicted, the first, second, third, and fourth lamina 102, 104, 106, and 108 define staggered lengths. However, it should be appreciated that in alternative exemplary embodiments the lengths of the first, second, third, and fourth lamina 102, 104, 106, and 108 may be any suitable length as to form the fingers 110 of the CMC skin panel 100. For example, in alternative exemplary embodiment the second length and the fourth length may extend along the lateral direction the same distance.

It should be appreciated that in FIG. 2, the CMC skin panel 100 includes the first, second, third, and fourth lamina 102, 104, 106, and 108 that generally form two fingers 110 of the CMC skin panel 100. However, the number of lamina is provided by way of example only and in alternative exemplary embodiments, the CMC skin panel 100 may include any suitable number of lamina that form any suitable number of fingers.

Figure 3:
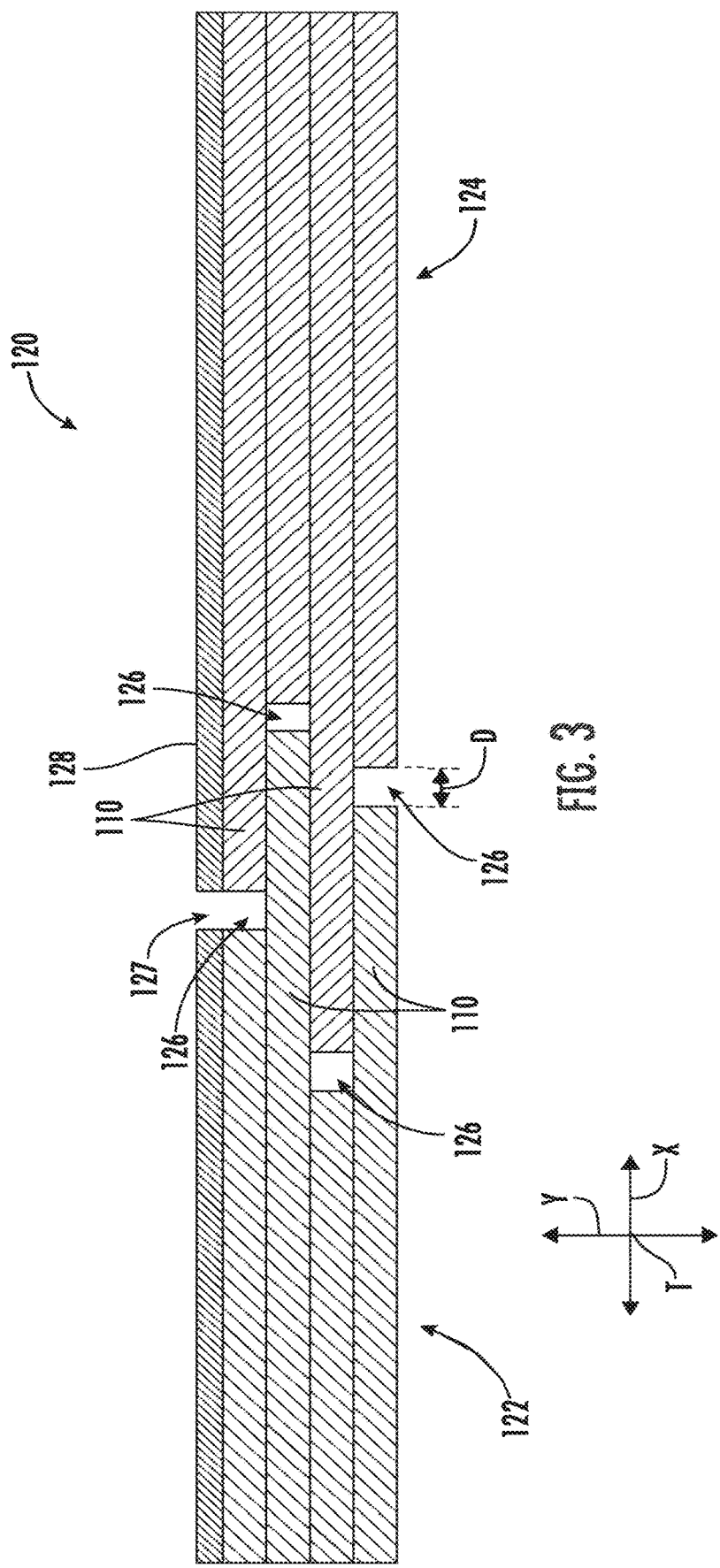
FIG. 3 is a cross-sectional view of a hypersonic skin assembly in accordance with an exemplary aspect of the present disclosure.

In addition, as depicted the fingers 110 each include a single ply the defines a depth of the finger along the thickness direction Y. However, it should be appreciated that the single ply is provided by way of example only and in alternative exemplary embodiments, the fingers 110 may include any suitable number of plies that form any suitable depth of the fingers. Referring now to FIG. 3, a cross-sectional view of a skin assembly 120 in accordance with an exemplary aspect of the present disclosure is provided. The skin assembly 120 defines a thickness direction Y, a lateral direction X, and a transverse direction T (into and out of the page in FIG. 3). It should be appreciated that the lateral direction X and the transverse direction T are local directions that are perpendicular to the thickness direction Y. As such, the lateral direction X and the transverse direction T may be positioned in any suitable direction that is perpendicular to the thickness direction Y. In addition, the skin assembly 120 generally includes the first CMC skin panel 122 and a second skin panel 124 configured in substantially the same manner as the CMC skin panel 100 of FIG. 2. For example, the second skin panel 124 includes one or more fingers 110 that define one or more notches. The fingers 110 of the first CMC skin panel 122 and the second skin panel 124 are interdigitated as to form the skin assembly 120. In particular, as used herein, the term "interdigitated" with respect to the fingers of adjacent CMC skin panels refers to the finger(s) of one CMC panel positioned within the notch(es) of an adjacent CMC skin panel and vice versa.

It should be appreciated that the second skin panel may be constructed from any suitable laminated material. For example, the second skin panel may be formed from a CMC, and as such, the skin assembly formed may include two CMC skin panels. In addition, in another example, the second skin panel may be formed from a laminated metal material, and as such the skin assembly formed may include CMC skin panel and a laminated metal skin panel.

Moreover, it should be appreciated that skin assembly formed by the first CMC skin panel 122 and the second skin panel 124 may be configured to avoid drag, and more specifically protuberance drag that may be caused by the skin assembly experiencing thermal stress that may occur during an operation condition of the hypersonic vehicle.

During demanding operation conditions, such as by way of non-limiting example of a hypersonic vehicle, the skin assembly 120 may experience high thermal loading. This high thermal loading may cause thermal expansion of at least a portion of the first CMC skin panel 122, at least a portion of the second CMC skin panel 124, or a combination thereof. Accommodating thermal expansion of the first CMC skin panel 122 and the second skin panel 124 is critical as thermal expansion may cause thermal stress and buckling within the skin assembly 120. Thus, the first CMC skin panel 122 and the second skin panel 124 define a plurality of staggered expansion gaps 126 therebetween that are configured to accommodate thermal expansion of the first CMC skin panel 122 and the second skin panel 124 during predetermined conditions. More particularly, the one or more fingers of the first CMC skin panel 122 and the one or more fingers of the second CMC skin panel 124 define in part the plurality of staggered expansion gaps 126. In predetermined conditions when the first CMC skin panel 122 and the second skin panel 124 experience thermal expansion, the plurality of staggered expansion gaps may completely, or partially close. As such, the plurality of staggered expansion gaps 126 mitigate thermal stress between the first CMC skin panel 122 and the second skin panel 124 and mitigate buckling that may occur between first CMC skin panel 122 and the second skin panel 124. It should be appreciated, that as used herein, the term "staggered expansion gaps" refers to two or more gaps between adjacent CMC skin panels spaced along the thickness direction Y and positioned in at least two different locations along the lateral direction X.

It should be appreciated that the plurality of staggered expansion gaps 126 may be defined generally along any suitable direction perpendicular to the thickness direction Y of the skin assembly 120. More particularly, the plurality of staggered expansion gaps 126 may be defined along a direction that thermal expansion of the first and the second CMC skin panels 122, 124 may occur during a demanding operating condition, such as a hypersonic operating condition. In one non-limiting example, the plurality of staggered expansion gaps 126 may be defined along the lateral direction X of the skin assembly (and extend along the transverse direction T) that generally aligns with a direction that thermal expansion occurs when the skin assembly 120 is installed on the hypersonic vehicle. Additionally, or alternatively, the plurality of staggered expansion gaps 126 may be defined along the transverse direction (and extend along the lateral direction X) that generally aligns with a direction that thermal expansion occurs when the skin assembly 120 is in use.

Further, each of the plurality of staggered expansion gaps 126 normally defines a distance D. The distance D of each of the plurality of staggered expansion gaps 126 is configured to accommodate the anticipated thermal expansion of the first and the second CMC skin panels 122, 124 during use. As such, the distance D of each of the plurality of staggered expansion gaps 126 may be any suitable distance as to accommodate the anticipated thermal expansion of the first and the second CMC skin panels 122, 124 during hypersonic operation. In addition, the distance D may be configured to maintain adequate sealing function of the skin assembly during use including during hypersonic or non-hypersonic operation by way of non-limiting examples.

In addition, during operating, the skin assembly 120 may experience an ingress of gas that may lead to the oxidation of the first and the second CMC skin panels 122, 124. As such, the skin assembly 120 shown includes an environmental-barrier-coating 128 placed on the first and the second CMC skin panel 122, 124 (i.e., applied to the first and second CMC skin panels 122, 124 directly or through one or more intermediate coatings, such as bond coatings) to protect the first and second CMC skin panels 122, 124. As used herein, environmental-barrier-coating or "EBC" refers to a coating system comprising one or more layers of ceramic materials, each of which provides specific or multi-functional protections to the underlying CMC. EBCs generally include a plurality of layers, such as rare earth silicate coatings (e.g., rare earth disilicates such as slurry or APS-deposited yttrium ytterbium disilicate (YbYDS)), alkaline earth aluminosilicates (e.g., comprising barium-strontium-aluminum silicate (BSAS), such as having a range of BaO, SrO, $Al_2O_3$, and/or $SiO_2$ compositions), hermetic layers (e.g., a rare earth disilicate), and/or outer coatings (e.g., comprising a rare earth monosilicate, such as slurry or APS-deposited yttrium monosilicate (YMS)). One or more layers may be doped as desired, and the EBC may also be coated with an abradable coating.

It should be appreciated that the skin assembly 120 may optionally include the EBC 128 if protection of the underlying first and the second CMC skin panels 122, 124 is required for the particular application of the skin assembly 120.

In addition, during an operation condition, the EBC 128 may experience thermal expansion. As such, the EBC 128 defines a thermal expansion gap 127 configured to accommodate thermal expansion of the EBC 128. As depicted, the thermal expansion gap 127 is positioned above the vertically most outward staggered expansion gap 126.

It should be appreciated that in alternative exemplary embodiments, the thermal expansion gap 127 of the EBC 128 may be positioned in any suitable location to accommodate thermal expansion of the EBC 128. Further, in alternative exemplary embodiments, the EBC 128 may include a plurality of thermal expansion gaps 127 that are configured to accommodate thermal expansion of the EBC 128 during certain operating conditions of the hypersonic vehicle. In addition, in alternative exemplary embodiments, the EBC 128 may not include the thermal expansion gap 127.

Figure 4:
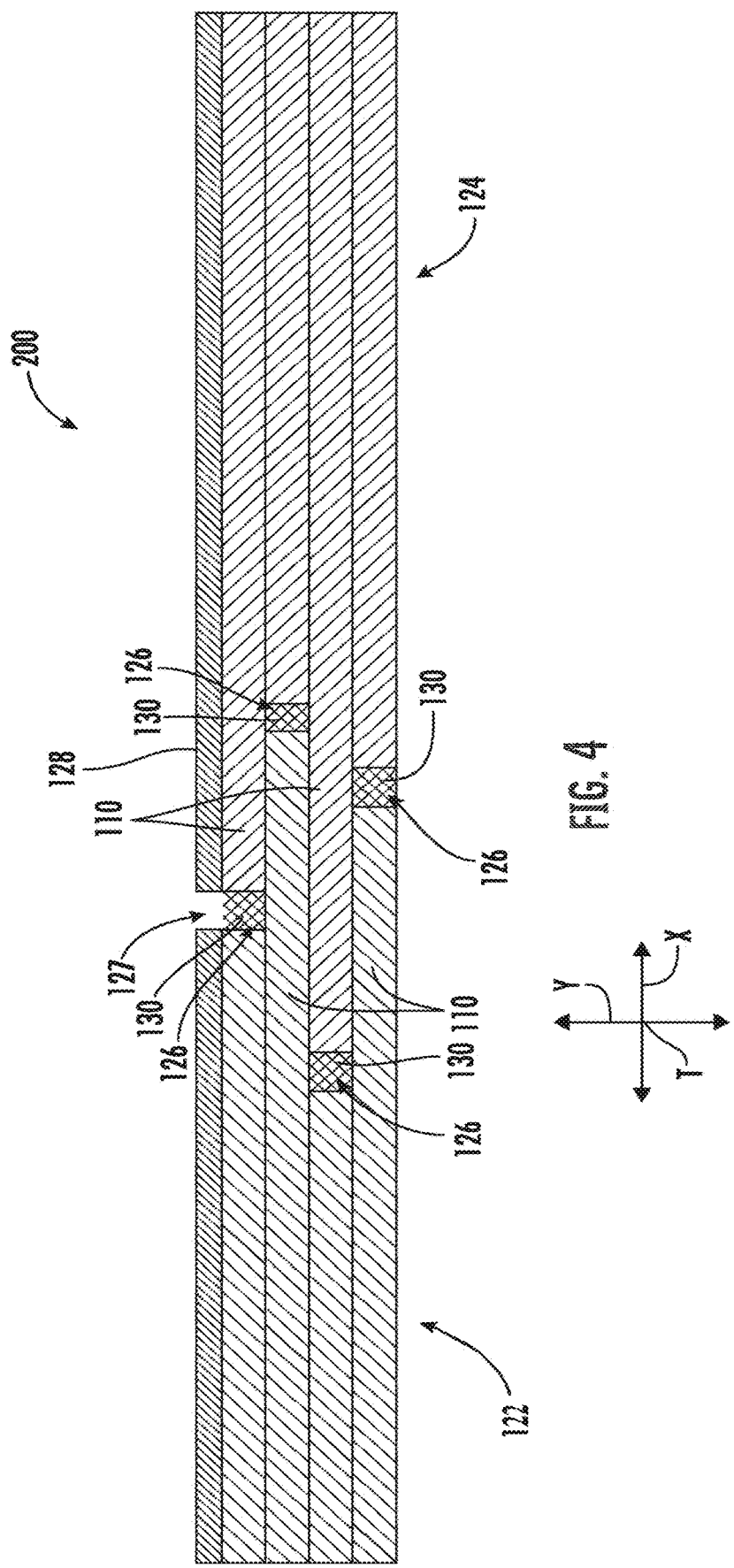
FIG. 4 is a cross-sectional view of a hypersonic skin assembly in accordance with another exemplary aspect of the present disclosure.

Referring now to FIG. 4, a cross-sectional view of a skin assembly 200 in accordance with another exemplary aspect of the present disclosure is provided. The exemplary skin assembly 200 of FIG. 4 may be configured in substantially the same manner as the exemplary skin assembly 120 of FIG. 3, and accordingly, the same or similar numbers may refer to the same or similar parts.

For example, the skin assembly 200 of FIG. 4 generally includes a first CMC skin panel 122 and a second CMC skin panel 124, one or more fingers 110 that define one or more notches 112 of the first CMC skin panel 122 and one or more fingers 110 that define one or more notches 112 of the second CMC skin panel 124. The one or more fingers of each CMC skin panel 122, 124 are interdigitated as to form a substantially continuous skin assembly 200. In addition, the skin assembly 200 includes an EBC 128 having a thermal expansion gap 127. The EBC 128 placed on the first CMC skin panel 122 and the second CMC skin panel 124. However, for the embodiment of FIG. 4, a plurality of staggered expansion gaps 126 defined between the first and the second CMC skin panels 122, 124 are now configured to hold a material 130 that may change phase from a solid to a liquid at a temperature experienced during hypersonic operation. It should be appreciated, that material 130 may be any suitable material that may change phase from a solid to a liquid at a temperature experienced during hypersonic operation. For example, the material 130 may be a silicon that changes phase from a solid to a liquid at a temperature of about 2525 degrees Fahrenheit during hypersonic operation. Additionally, the materials 130 may be a predominantly silicon-containing alloy containing minor alloying constituents, or any alloy such that the material changes phase from a solid to a liquid at another desired temperature. In addition, the material held within the staggered expansion gaps may provide a hermetic seal for the skin assembly 200. In particular, the material within the staggered expansion gaps 126 may prevent air from entering the staggered expansion gaps 126, which may lead to the oxidation of the first and the second CMC skin panels 122, 124. In addition, the material 130 within the staggered expansion gaps 126 may prevent air from passing through the staggered expansion gaps 126 and entering an internal compartment of a hypersonic vehicle (e.g., hypersonic aircraft 2 of FIG. 1) that it may be constrained or attached to.

Figure 5A:
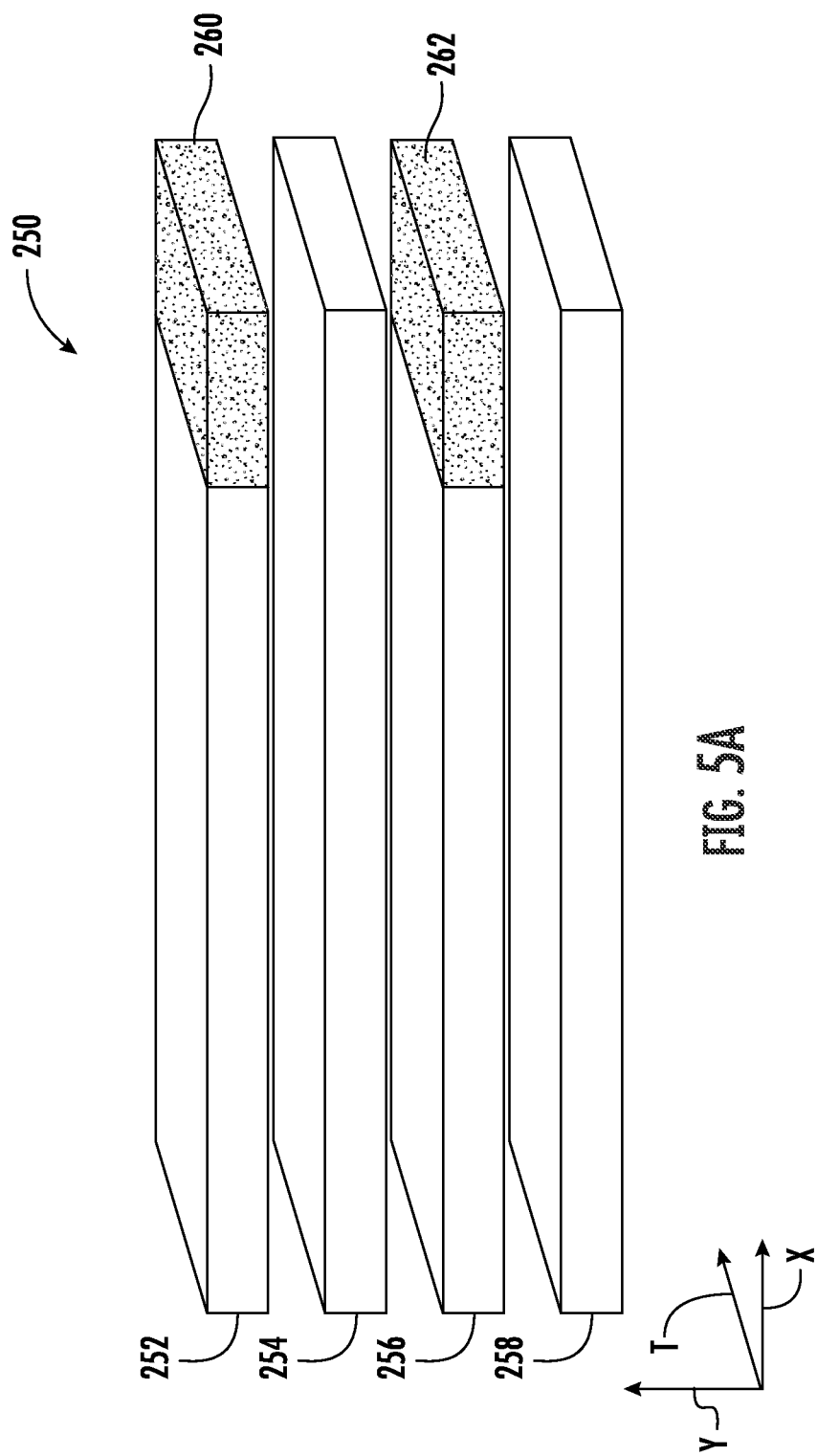
FIG. 5A is an exploded view illustrating components used in the construction of a ceramic-matrix-composite skin panel in accordance with an exemplary aspect of the present disclosure.
Figure 5B:
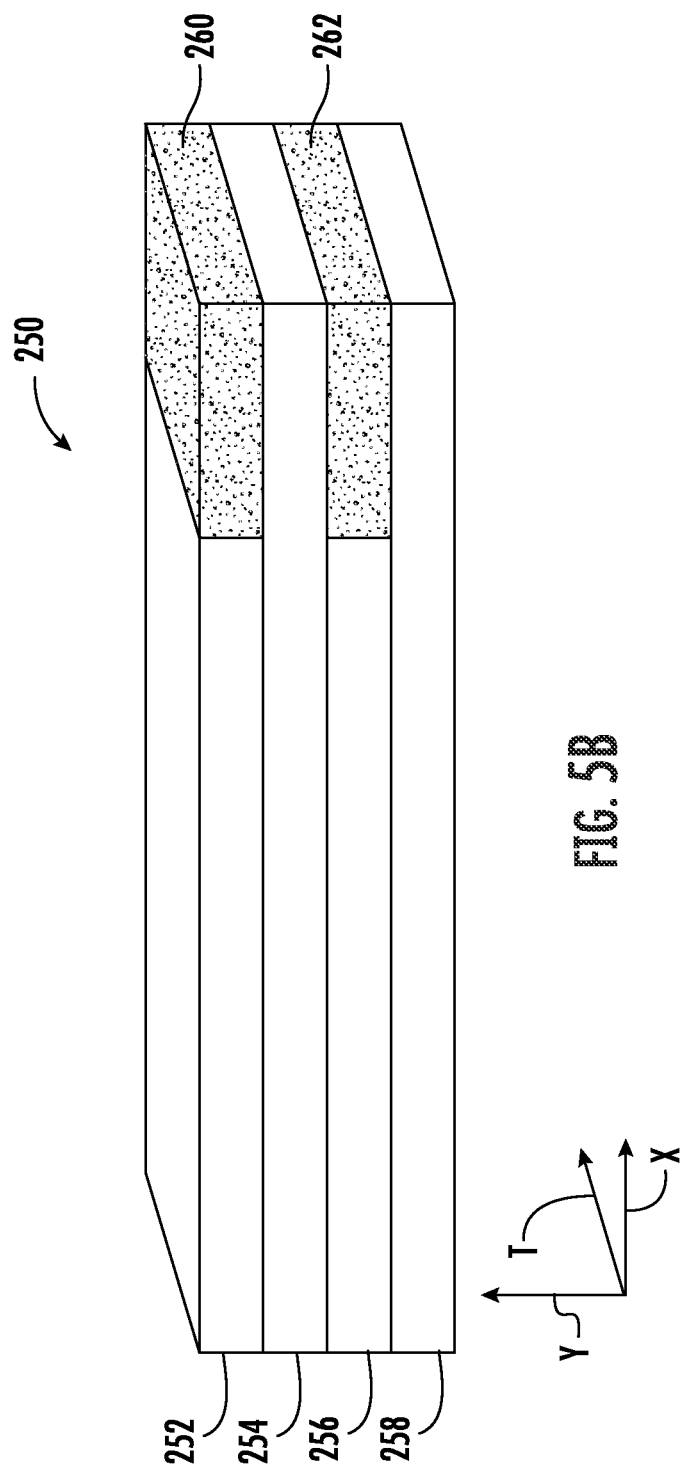
FIG. 5B illustrates the component shown in FIG. 5A in an assembled configuration in accordance with an exemplary aspect of the present disclosure is provided.

Referring now to FIGS. 5A-5C, the construction of an embodiment of a formed CMC skin panel 250 (FIG. 5C) is illustrated as one non-limiting example. Referring now to FIG. 5A, a first lamina 252, a second lamina 254, a third lamina 256, and a fourth lamina 258 to be stacked and inter-bonded is shown. The first lamina 252 and the third lamina 256 include a removable portion 260, 262 at a terminating end of each lamina 252, 254 that when removed form one or more fingers 264 of the CMC skin panel 250. It should be appreciated that the removable portions 260, 262 may be an integral portion of or coupled to the first lamina 252 and the third lamina 256. For example, the removable portion 260 of the first lamina 252 may be an integral portion at the terminating end of the first lamina 252 and the removable portion 262 of the third lamina 256 may be an integral portion at the terminating end of the third lamina 256.

Alternatively, the removable portion 260 of the first lamina 252 may be a non-integral portion, such as a boron nitride or meltable insert coupled to the first lamina 252 and the removable portion 262 of the third lamina 256 may similarly be a non-integral portion, such as a boron nitride or meltable insert coupled to the third lamina 256.

Referring now to FIG. 5B, the first, second, third, and fourth lamina 252, 254, 256, and 258 are stacked and inter-bonded to form the CMC skin panel 250. This process of stacking the first, second, third, and fourth lamina 252, 254, 256, and 258 on top of one another is often referred to in the art as "laying-up" the first, second, third, and fourth lamina 252, 254, 256, and 258. If it is desired to cause the CMC skin panel 250 to have a particular shape, the CMC skin panel 250 may be laid-up on or in a tool, such as on a mandrel, on a die or in a mold (not shown) having a shape complementary to that of the desired shape for the CMC skin panel 250, such techniques being well known to those of ordinary skill in the art.

Referring now to FIG. 5C, the CMC skin panel 250 after removing the removable portions 260, 262 from the first lamina 252 and the second lamina 254 is shown. The CMC skin panel 250 defines a thickness direction Y, a lateral direction X, and a transverse direction T. It should be appreciated that the lateral direction X and the transverse direction T are local directions that are perpendicular to the thickness direction Y. As such, the lateral direction X and the transverse direction T may be positioned in any suitable direction that is perpendicular to the thickness direction Y. In addition, it should be appreciated that when the removable portions 260, 262 of the first lamina 252 and the third lamina 256 are portions of the first and third lamina 252, 256 at the terminating end of each, the removable portions 260, 262 may be machined away to form the one or more fingers 264. Similarly, when the removable portions 260, 262 are removable boron nitride inserts or meltable inserts, the removable portions may be machined away or melted away to form the one or more fingers 264.

As shown the CMC skin panel 250 of FIGS. 5A-5C include four stacked and inter-bonded first, second, third, and fourth lamina 252, 254, 256, and 258. It should be appreciated that the four stacked and inter-bonded lamina are provided by way of example only and in alternative exemplary embodiments the CMC skin panel 250 may be constructed from any suitable number of lamina. Further, it should be appreciated that each lamina may include one or more plies. In addition, as shown, only the first lamina 252 and the third lamina 256 include removable portions 260, 262. It should be appreciated that in alternative exemplary embodiments any suitable lamina of the CMC skin panel 250 may include a removable portion that when removed from at least in part one or more fingers 264 of the CMC skin panel 250.

In addition, the CMC skin panel 250, when joined with an adjacent skin panel, is configured to define in part a plurality of staggered expansion gaps along a first direction (e.g., the lateral direction X) or a second direction (e.g., the transverse direction T). For example, as depicted, the CMC skin panel 250 is configured to define a plurality of expansion gaps along the lateral direction X (and extend along the transverse direction T).

It should be appreciated that the configuration depicted is provided by way of example only and in alternative exemplary embodiments, the CMC skin panel 250, when joined with an adjacent skin panel, may be configured to define in part a plurality of staggered expansion gaps along any suitable direction that thermal expansion may occur. For example, in alternative exemplary embodiments the CMC skin panel 250 may be configured such that the CMC skin panel 250 defines in part the plurality of staggered expansion gaps along the transverse direction T (and extend along the lateral direction).

Figure 6:
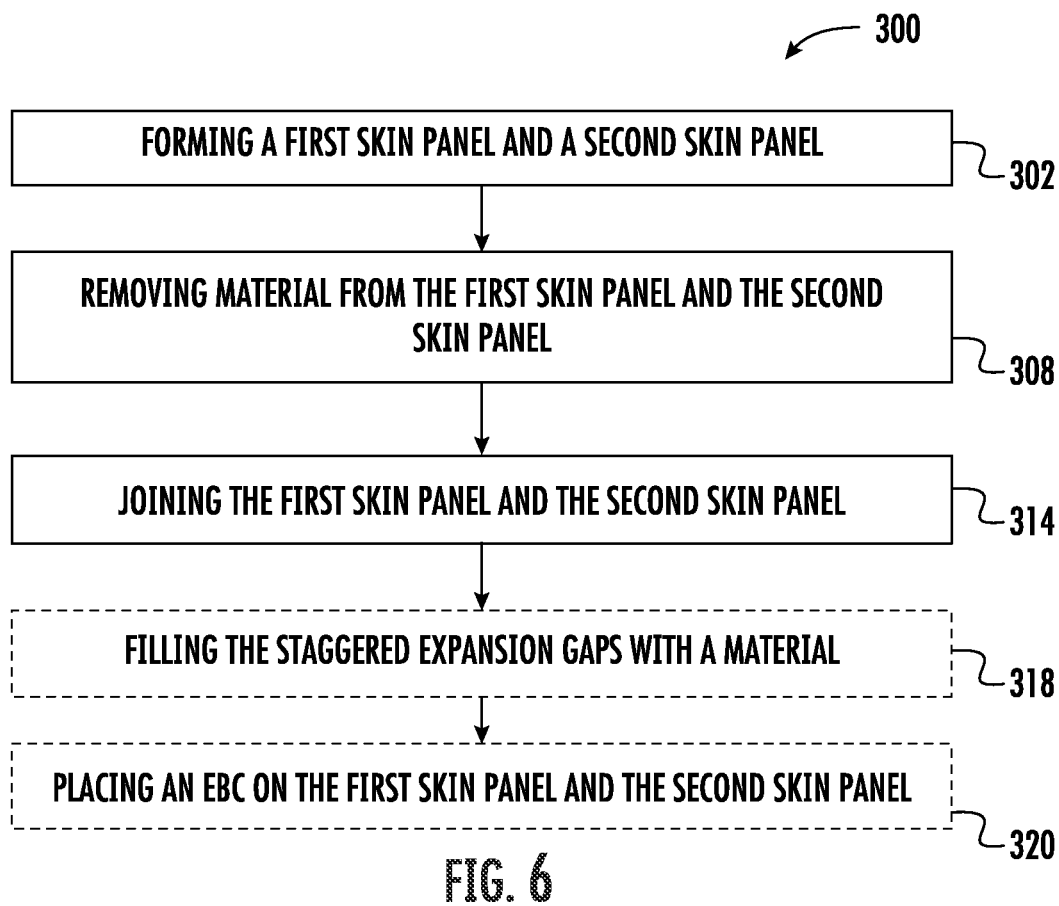
FIG. 6 is a method of constructing a skin assembly in accordance with an exemplary aspect of the present disclosure.

Referring now to FIG. 6, a method 300 of constructing a skin assembly for a hypersonic vehicle is provided. The method 300 generally includes at 302 forming a first skin panel and a second skin panel. Each of the CMC skin panels includes a plurality of lamina. In some embodiments, forming a first skin panel and a second skin panel may further include joining a first plurality of lamina of the first skin panel together and joining a second plurality of lamina of the first skin panel together. In some embodiments, forming a first skin panel and a second skin panel may further includes sintering, curing, or joining the first plurality of lamina together to form the first skin panel and sintering, curing, or joining the second plurality of lamina together to form the second skin panel.

Further, the method 300 includes at 308, removing material from the first skin panel and the second skin panel, respectively, to form one or more first fingers and one more second fingers. In some embodiments, removing material from the first skin panel and the second skin panel may further include machining away material, heating the material (e.g., melting/vaporizing) or otherwise etching away the material from the first skin panel to form the one or more first fingers and machining away material, heating the material (e.g., melting/vaporizing) or otherwise etching away the material from the second skin panel to form the one or more second fingers. Alternatively, in some embodiments, removing material from first skin panel and the second skin panel may further include machining away the boron nitride removable inserts, heating the material (e.g., melting/vaporizing) or otherwise etching away the material.

It should be appreciated that in some embodiments, each lamina of the first skin panel may extend a length that is configured to form one or more first fingers of the first skin panel. As such, one or more first fingers of the first skin panel may be formed without adding material to, or removing material from, the first skin panel. In addition, in some embodiments, each lamina of the second skin panel may extend a length that is configured to form one or more second fingers of the second skin panel. As such, one or more second fingers of the second skin panel may be formed without adding material to, or removing material from, the second skin panel.

In addition, the method 300 includes at 314 joining the first skin panel and the second skin panel such that the first skin panel and the second skin panel define a plurality of staggered expansion gaps therebetween. In some embodiments, joining the first skin panel and the second skin panel together includes interdigitating the one or more first fingers of with the one or more second fingers.

The method 300 may include at 318 filling the staggered expansion gaps with a material that is configured to change phase from a solid to a liquid during hypersonic operation and hermetically seal the skin assembly. The method 300 may include at 320 placing an environmental barrier coating on the first skin panel and the second skin panel to form an outer surface of the skin assembly.

The previously described embodiments may have many advantageous features and advantages. These advantageous features and advantages include the ability to mitigate thermal stresses, such as buckling, while maintaining an aerodynamic surface of the structure that the skin assembly may be constrained or attached to. The ability to adjust the distance defined by the staggered expansion gaps in order to accommodate anticipated thermal conditions. The ability to adjust the depth of the one or more fingers to maintain a bending stiffness, simply assembly, or simplify disassembly of the skin assembly. The ability to select a material to fill the staggered expansion gaps based on the anticipated thermal conditions. The ability to use any laminated material to form the skin assembly. It should be appreciated that all the advantageous features and all the advantages previously described are not required to be incorporated into every embodiment previously described.

Further aspects are provided by the subject matter of the following clauses:

A skin assembly, comprising: a first ceramic-matrix-composite skin panel comprising one or more first fingers extending along a first direction; a second ceramic-matrix-composite skin panel comprising one or more second fingers extending along the first direction, the one or more second fingers interdigitated with the one or more first fingers to define a plurality of staggered expansion gaps between the first ceramic-matrix-composite skin panel and the second ceramic-matrix-composite skin panel wherein the plurality of staggered expansion gaps are configured to accommodate thermal expansion of at least a portion of the skin assembly.

The skin assembly of any preceding clause, wherein the first ceramic-matrix-composite skin panel comprises a first plurality of inter-bonded stacked lamina, wherein each of the lamina of the first ceramic-matrix-composite skin panel extend a length along the first direction, and wherein the lengths of the lamina are staggered to form the one or more fingers of the first ceramic-matrix-composite skin panel.

The skin assembly of any preceding clause, wherein the second ceramic-matrix-composite skin panel comprises a second plurality of inter-bonded stacked lamina, wherein each of the lamina of the second ceramic-matrix-composite skin panel extend a length along the first direction, and wherein the lengths of the lamina are staggered to form the one or more fingers of the second. ceramic-matrix-composite skin panel.

The skin assembly of any preceding clause, wherein a material is held within the plurality of staggered expansion gaps and wherein the material is configured to change phase from a solid to a liquid during the hypersonic operating condition.

The skin assembly of any preceding clause, wherein the skin assembly further defines a second direction, wherein the plurality of staggered expansion gaps is a first plurality of staggered expansion gaps, and wherein a second plurality of staggered expansion gaps are defined along the second direction.

The skin assembly of any preceding clause, further comprising: an environmental barrier coating placed on the first ceramic-matrix-composite skin panel and the second ceramic-matrix-composite skin panel, wherein the environmental barrier coating forms an outer surface of the skin assembly.

The skin assembly of any preceding clause, wherein the first ceramic-matrix-composite skin panel is made from a silicon carbide-fiber-reinforced silicon carbide composite or a carbon-fiber-reinforced silicon carbide composite, and wherein the second ceramic-matrix-composite skin panel is made from a silicon carbide-fiber-reinforced silicon carbide composite or a carbon-fiber-reinforced silicon carbide composite.

The skin assembly of any preceding clause, wherein the one or more first fingers each comprise one or more plies, and wherein the one more second fingers each comprise one or more plies.

A skin assembly, comprising: a first skin panel comprising one or more first fingers extending along a first direction; a second skin panel comprising one or more second fingers extending along the first direction, the one or more second fingers interdigitated with the one or more first fingers to define a plurality of staggered expansion gaps between the first panel and the second skin panel wherein the plurality of staggered expansion gaps are configured to accommodate thermal expansion of at least a portion of the skin assembly.

The skin assembly of any preceding clause, wherein the first skin panel comprises a first plurality of inter-bonded stacked lamina, wherein each of the lamina of the first skin panel extend along the first direction, and wherein the lengths of the lamina are staggered to form the one or more fingers of the first skin panel.

The skin assembly of any preceding clause, wherein the second skin panel comprises a second plurality of inter-bonded stacked lamina, wherein each of the lamina of the second skin panel extend along the first direction, and wherein the lengths of the lamina are staggered to form the one or more fingers of the second skin panel.

The skin assembly of any preceding clause, wherein a material is held within the plurality of staggered expansion gaps and wherein the material is configured to change phase from a solid to a liquid during the hypersonic operating condition.

A method of constructing a skin assembly, the method comprising: forming a first skin panel and a second skin panel; removing material from the first skin panel and the second skin panel, respectively, to form one or more first fingers and one more second fingers; and joining the first skin panel and the second skin panel such that the first skin panel and the second skin panel define a plurality of staggered expansion gaps therebetween.

The method of any preceding clause, wherein forming a first skin panel and second skin panel comprises joining a first plurality of lamina of the first skin panel together, and forming a first skin panel and second skin panel comprises joining a second plurality of lamina of the second skin panel together.

The method of any preceding clause, wherein forming a first skin panel and second skin panel further comprises sintering, curing, or joining the first plurality of lamina together to form the first skin panel, and wherein forming a first skin panel and second skin panel further comprises sintering, curing, or joining the second plurality of lamina together to form the second skin panel.

The method of any preceding clause, wherein removing material from the first skin panel and the second skin panel comprises machining away material from the first skin panel to form the one or more first fingers, and wherein removing material from the first skin panel and the second skin panel comprises machining away material from the second skin panel to form the one or more second fingers.

The method of any preceding clause, wherein removing material from first skin panel and the second skin panel comprises machining away boron nitride removable inserts or heating a meltable insert.

The method of any preceding clause, wherein joining the first skin panel and the second skin panel together comprises interdigitating the one or more first fingers of with the one or more second fingers.

The method of any preceding clause, further comprising: filling the staggered expansion gaps with a material that is configured to change phase from a solid to a liquid during hypersonic operation and hermetically seal the skin assembly.

The method of any preceding clause, further comprising: placing an environmental barrier coating on the first skin panel and the second skin panel to form an outer surface of the skin assembly.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

I claim:

1. A skin assembly, comprising:
   a first ceramic-matrix-composite skin panel comprising one or more first fingers extending along a first direction; and
   a second ceramic-matrix-composite skin panel comprising one or more second fingers extending along the first direction, the one or more second fingers interdigitated with the one or more first fingers to define a plurality of staggered expansion gaps between the first ceramic-matrix-composite skin panel and the second ceramic-matrix-composite skin panel wherein the plurality of staggered expansion gaps are configured to accommodate thermal expansion of at least a portion of the skin assembly when an outer surface of the skin assembly is subject to a speed greater than Mach 5.

2. The skin assembly of claim 1, wherein the first ceramic-matrix-composite skin panel comprises a first plurality of inter-bonded stacked lamina, wherein each of the lamina of the first ceramic-matrix-composite skin panel extends a length along the first direction, and wherein the lengths of the lamina are staggered to form the one or more first fingers of the first ceramic-matrix-composite skin panel.

3. The skin assembly of claim 1, wherein the second ceramic-matrix-composite skin panel comprises a second plurality of inter-bonded stacked lamina, wherein each of the lamina of the second ceramic-matrix-composite skin panel extends a length along the first direction, and wherein the lengths of the lamina are staggered to form the one or more second fingers of the second ceramic-matrix-composite skin panel.

4. The skin assembly of claim 1, wherein a material is held within the plurality of staggered expansion gaps and wherein the material is configured to change phase from a solid to a liquid when the outer surface of the skin assembly is subject to a speed greater than Mach 5.

5. The skin assembly of claim 1, wherein the skin assembly further defines a second direction, wherein the plurality of staggered expansion gaps is a first plurality of staggered expansion gaps, and wherein a second plurality of staggered expansion gaps are defined along the second direction.

6. The skin assembly of claim 1, further comprising:
   an environmental barrier coating placed on the first ceramic-matrix-composite skin panel and the second ceramic-matrix-composite skin panel, wherein the environmental barrier coating forms an outer surface of the skin assembly.

7. The skin assembly of claim 1, wherein the first ceramic-matrix-composite skin panel is made from a silicon carbide-fiber-reinforced silicon carbide composite or a carbon-fiber-reinforced silicon carbide composite, and wherein the second ceramic-matrix-composite skin panel is made from a silicon carbide-fiber-reinforced silicon carbide composite or a carbon-fiber-reinforced silicon carbide composite.

8. The skin assembly of claim 1, wherein the one or more first fingers each comprise one or more plies, and wherein the one or more second fingers each comprise one or more plies.

9. A skin assembly, comprising:
   a first skin panel comprising one or more first fingers extending along a first direction; and
   a second skin panel comprising one or more second fingers extending along the first direction, the one or more second fingers interdigitated with the one or more first fingers to define a plurality of staggered expansion gaps between the first skin panel and the second skin panel wherein the plurality of staggered expansion gaps are configured to accommodate thermal expansion of at least a portion of the skin assembly when an outer surface of the skin assembly is subject to a speed greater than Mach 5.

10. The skin assembly of claim 9, wherein the first skin panel comprises a first plurality of inter-bonded stacked lamina, wherein each of the lamina of the first skin panel extends along the first direction, and wherein lengths of the lamina are staggered to form the one or more first fingers of the first skin panel.

11. The skin assembly of claim 9, wherein the second skin panel comprises a second plurality of inter-bonded stacked lamina, wherein each of the lamina of the second skin panel extends along the first direction, and wherein lengths of the lamina are staggered to form the one or more second fingers of the second skin panel.

12. The skin assembly of claim 9, wherein a material is held within the plurality of staggered expansion gaps and wherein the material is configured to change phase from a solid to a liquid when the outer surface of the skin assembly is subject to a speed greater than Mach 5.

13. A skin assembly, comprising:
a first ceramic-matrix-composite skin panel comprising one or more first fingers extending along a first direction;
a second ceramic-matrix-composite skin panel comprising one or more second fingers extending along the first direction, the one or more second fingers interdigitated with the one or more first fingers to define a plurality of staggered expansion gaps between the first ceramic-matrix-composite skin panel and the second ceramic-matrix-composite skin panel, wherein the plurality of staggered expansion gaps are configured to enable thermal expansion of the skin assembly when an outer surface of the skin assembly is subject to a speed greater than Mach 5; and
a material configured to change phase from a solid to a liquid when subject to the speed greater than Mach 5, wherein the material is held within the plurality of staggered expansion gaps.

14. The skin assembly of claim 13, wherein the first ceramic-matrix-composite skin panel comprises a first plurality of inter-bonded stacked lamina, wherein each of the lamina of the first ceramic-matrix-composite skin panel extends a length along the first direction, and wherein the lengths of the lamina are staggered to form the one or more first fingers of the first ceramic-matrix-composite skin panel.

15. The skin assembly of claim 14, wherein the one or more first fingers of the first ceramic-matrix-composite skin panel are configured to define a first plurality of channels.

16. The skin assembly of claim 13, wherein the second ceramic-matrix-composite skin panel comprises a second plurality of inter-bonded stacked lamina, wherein each of the lamina of the second ceramic-matrix-composite skin panel extends a length along the first direction, and wherein the lengths of the lamina are staggered to form the one or more second fingers of the second ceramic-matrix-composite skin panel.

17. The skin assembly of claim 16, wherein the one or more second fingers of the second ceramic-matrix-composite skin panel are configured to define a second plurality of channels.

18. The skin assembly of claim 13, wherein the skin assembly further defines a second direction, wherein the plurality of staggered expansion gaps is a first plurality of staggered expansion gaps, and wherein a second plurality of staggered expansion gaps is defined along the second direction.

19. The skin assembly of claim 13, further comprising:
an environmental barrier coating placed on the first ceramic-matrix-composite skin panel and the second ceramic-matrix-composite skin panel, wherein the environmental barrier coating forms an outer surface of the skin assembly.

20. The skin assembly of claim 13, wherein the first ceramic-matrix-composite skin panel is made from a silicon carbide-fiber-reinforced silicon carbide composite or a carbon-fiber-reinforced silicon carbide composite, and wherein the second ceramic-matrix-composite skin panel is made from a silicon carbide-fiber-reinforced silicon carbide composite or a carbon-fiber-reinforced silicon carbide composite.

* * * * *